(12) United States Patent
Shimizu et al.

(10) Patent No.: US 11,009,139 B2
(45) Date of Patent: May 18, 2021

(54) RELIEF VALVE

(71) Applicant: AISIN AW CO., LTD., Anjo (JP)

(72) Inventors: Tetsuya Shimizu, Anjo (JP); Toru Sugiyama, Anjo (JP); Masaya Iwata, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/604,782

(22) PCT Filed: May 17, 2018

(86) PCT No.: PCT/JP2018/019149
§ 371 (c)(1),
(2) Date: Oct. 11, 2019

(87) PCT Pub. No.: WO2018/212289
PCT Pub. Date: Nov. 22, 2018

(65) Prior Publication Data
US 2020/0103044 A1   Apr. 2, 2020

(30) Foreign Application Priority Data

May 19, 2017 (JP) .............................. JP2017-099594

(51) Int. Cl.
*F16K 17/04* (2006.01)
*F16K 17/06* (2006.01)
(Continued)

(52) U.S. Cl.
CPC ............ *F16K 17/044* (2013.01); *F16K 17/06* (2013.01); *F16K 15/044* (2013.01); *F16K 17/048* (2013.01);
(Continued)

(58) Field of Classification Search
CPC ................................................. Y10T 137/7925
See application file for complete search history.

(56) References Cited

U.S. PATENT DOCUMENTS

| 1,754,641 A | * | 4/1930 | Mobley | ............... F04D 15/0011 |
| | | | | 137/538 |
| 1,841,337 A | * | 1/1932 | Roessler | ................. F16K 17/04 |
| | | | | 137/538 |

(Continued)

FOREIGN PATENT DOCUMENTS

| GB | 2408561 A | 6/2005 |
| JP | H01-144575 U | 10/1989 |

(Continued)

OTHER PUBLICATIONS

Aug. 14, 2018 International Search Report issued in International Patent Application No. PCT/JP2018/019149.

*Primary Examiner* — Marina A Tietjen
*Assistant Examiner* — Frederick D Soski
(74) *Attorney, Agent, or Firm* — Oliff PLC

(57) ABSTRACT

A relief valve that includes a tube; a valve configured to slide along an inner wall of the tube in an axial direction, and a spring that urges the valve, wherein the valve has a hydraulic pressure receiving surface on a first axial side that is one side in the axial direction, and a spring abutment against which the spring abuts, on a second axial side opposite to the first axial side, and the tube has a discharge oil passage having an opening in the inner wall and extending through the inner wall in a radial direction.

4 Claims, 3 Drawing Sheets

(51) Int. Cl.
*F16K 15/04* (2006.01)
*F16K 27/02* (2006.01)

(52) U.S. Cl.
CPC ......... *F16K 17/0473* (2013.01); *F16K 27/02* (2013.01); *Y10T 137/7925* (2015.04)

(56) References Cited

U.S. PATENT DOCUMENTS

| | | | | | |
|---|---|---|---|---|---|
| 1,916,766 | A | * | 7/1933 | Lytel | E21B 21/106 137/538 |
| 2,164,669 | A | * | 7/1939 | Thomas | F16K 17/0433 137/470 |
| 2,724,239 | A | * | 11/1955 | Fox | F02C 7/228 60/39.281 |
| 2,748,947 | A | * | 6/1956 | Jay | B01D 35/147 210/130 |
| 2,890,715 | A | * | 6/1959 | Ebersold | F16K 17/0473 137/494 |
| 2,896,662 | A | * | 7/1959 | Thomas | F16K 11/065 137/538 |
| 3,006,364 | A | * | 10/1961 | Osborn | F16L 55/052 137/538 |
| 4,161,189 | A | * | 7/1979 | Mueller, Jr. | F16K 17/04 137/514.7 |
| 4,282,896 | A | * | 8/1981 | Makino | F16K 15/063 137/495 |
| 5,078,028 | A | * | 1/1992 | Ishikawa | F16H 61/0021 477/117 |
| 5,135,027 | A | * | 8/1992 | Miki | F16K 31/0631 137/596.17 |
| 5,247,965 | A | * | 9/1993 | Oka | F15B 13/0402 137/546 |
| 5,259,414 | A | * | 11/1993 | Suzuki | F15B 13/0402 137/625.65 |
| 5,347,812 | A | * | 9/1994 | Nilsson | F04C 14/06 137/514.5 |
| 6,736,161 | B2 | * | 5/2004 | Kjellander | F16K 17/0433 137/454.5 |
| 9,377,124 | B2 | * | 6/2016 | Timmermans | F16K 31/0675 |
| 9,470,122 | B2 | * | 10/2016 | Lee | F01M 1/20 |
| 9,765,741 | B2 | * | 9/2017 | Schulz | F02M 59/366 |
| 2001/0027811 | A1 | * | 10/2001 | Hirano | F01M 1/16 137/538 |
| 2002/0059955 | A1 | * | 5/2002 | LaFleur | F16K 17/02 137/528 |
| 2002/0148508 | A1 | * | 10/2002 | Ittlinger | F16K 15/026 137/540 |
| 2003/0178068 | A1 | * | 9/2003 | Simmons, Jr. | B60T 17/22 137/538 |
| 2008/0207375 | A1 | * | 8/2008 | Shimizu | B60L 3/0023 475/127 |
| 2009/0071275 | A1 | * | 3/2009 | Yoshioka | B60T 1/005 74/335 |
| 2009/0114289 | A1 | * | 5/2009 | Martin | F16K 17/10 137/115.26 |
| 2009/0140189 | A1 | * | 6/2009 | Kokubu | F16K 31/0613 251/129.15 |
| 2009/0143180 | A1 | * | 6/2009 | Shimizu | F16H 61/12 475/127 |
| 2009/0143181 | A1 | * | 6/2009 | Shimizu | F16H 61/0206 475/128 |
| 2010/0028168 | A1 | * | 2/2010 | Shimizu | F04B 49/06 417/213 |
| 2010/0162695 | A1 | * | 7/2010 | Ishikawa | F16H 61/0021 60/422 |
| 2010/0163360 | A1 | * | 7/2010 | Fujii | F16K 11/07 192/3.33 |
| 2010/0181159 | A1 | * | 7/2010 | Shimizu | F16H 61/0031 192/85.63 |
| 2010/0193313 | A1 | * | 8/2010 | Shimizu | F16H 61/0031 192/3.3 |
| 2010/0193315 | A1 | * | 8/2010 | Shimizu | F16H 61/12 192/85.63 |
| 2010/0203989 | A1 | * | 8/2010 | Shirasaka | F16H 61/66272 474/28 |
| 2010/0243933 | A1 | * | 9/2010 | Shimizu | F16K 11/07 251/129.15 |
| 2010/0243940 | A1 | * | 9/2010 | Terada | F16K 17/08 251/320 |
| 2010/0313980 | A1 | * | 12/2010 | Shimizu | F04B 49/22 137/625.64 |
| 2011/0073196 | A1 | * | 3/2011 | Ishikawa | F16H 61/0206 137/487.5 |
| 2011/0073427 | A1 | * | 3/2011 | Ishikawa | F16H 61/143 192/3.3 |
| 2011/0124459 | A1 | * | 5/2011 | Shimizu | B60W 10/30 475/137 |
| 2011/0142690 | A1 | * | 6/2011 | Shimizu | F16H 61/0251 417/286 |
| 2011/0192474 | A1 | * | 8/2011 | Kobayashi | F15B 13/027 137/528 |
| 2011/0220823 | A1 | * | 9/2011 | Shimizu | F16H 61/0206 251/129.15 |
| 2011/0237394 | A1 | * | 9/2011 | Hirai | F16H 61/0031 477/167 |
| 2011/0237395 | A1 | * | 9/2011 | Shimizu | F16H 61/20 477/168 |
| 2011/0239803 | A1 | * | 10/2011 | Shimizu | F16H 61/0206 74/473.11 |
| 2011/0246037 | A1 | * | 10/2011 | Shimizu | F16H 61/143 701/68 |
| 2011/0247443 | A1 | * | 10/2011 | Shimizu | F16H 61/0021 74/473.11 |
| 2011/0278130 | A1 | * | 11/2011 | Shimizu | F16D 48/02 192/85.63 |
| 2011/0302915 | A1 | * | 12/2011 | Shimizu | F16H 61/143 60/464 |
| 2011/0308649 | A1 | * | 12/2011 | Shimizu | F16H 61/0206 137/565.11 |
| 2012/0137670 | A1 | * | 6/2012 | Shimizu | F16H 61/0206 60/430 |
| 2012/0144818 | A1 | * | 6/2012 | Shimizu | F16H 61/0031 60/459 |
| 2012/0241272 | A1 | * | 9/2012 | Jinno | F16H 61/143 192/3.29 |
| 2012/0247095 | A1 | * | 10/2012 | Jinno | F16H 61/143 60/459 |
| 2012/0247899 | A1 | * | 10/2012 | Jinno | F16H 61/143 192/3.3 |
| 2013/0012354 | A1 | * | 1/2013 | Shimizu | F16H 61/0031 477/83 |
| 2014/0116541 | A1 | * | 5/2014 | Jang | F01M 1/16 137/538 |
| 2015/0292634 | A1 | * | 10/2015 | Jackson | B23P 6/00 251/324 |
| 2016/0201796 | A1 | * | 7/2016 | Tsuchida | F16H 61/0267 74/473.11 |
| 2016/0377175 | A1 | * | 12/2016 | Maeda | F16H 61/0206 137/613 |

FOREIGN PATENT DOCUMENTS

| | | |
|---|---|---|
| JP | H03-52481 U | 5/1991 |
| JP | 2015-25551 A | 2/2015 |
| WO | 2018/025712 A1 | 2/2018 |

* cited by examiner

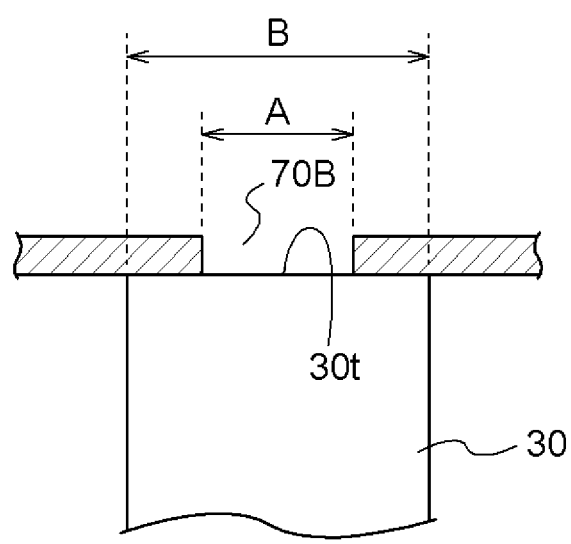

RELIEF VALVE

BACKGROUND

The present disclosure relates to a relief valve including a tubular portion, a valve element configured to slide along an inner wall of the tubular portion in an axial direction, and an urging member that urges the valve element.

Japanese Patent Application Publication No. 2015-25551 from a source described below discloses a relief valve configured to control a pressure in a hydraulic circuit such that, when the pressure in the hydraulic circuit reaches a set value, the relief valve is opened and a fluid is discharged from a discharge passage to reduce the pressure in the circuit (in Background Art, the following reference symbols in parentheses represent components described in Japanese Patent Application Publication No. 2015-25551). When a valve element (5) is in an initial state in the relief valve, a chamfered portion (53) on the distal end surface of the valve element (5) abuts against the inner surface of a relief opening (12a) on a valve element passage (11) side to interrupt a flow of the fluid between the valve element passage (11) and a relief flow passage (12). Thus, the relief opening (12a) is closed. In this structure, the area in which the distal end of the valve element (5) receives the pressure when the relief opening (12a) is closed by the valve element (5) differs from the area in which the distal end of the valve element (5) receives the pressure when the relief opening (12a) is open. Specifically, the pressure receiving area of the valve element (5) in the closed state is smaller than the pressure receiving area of the valve element (5) in the open state. Therefore, a pressure in a case of transition of the relief valve from the closed state to the open state (opening pressure) differs from a pressure in a case of transition of the relief valve from the open state to the closed state (closing pressure). Thus, a so-called hysteresis occurs between the opening pressure and the closing pressure.

SUMMARY

In view of the background described above, there is a demand to provide a relief valve in which a difference in a pressure to be received by a valve element between a case where the valve is open and a case where the valve is closed is small.

According to one aspect in view of the above, a relief valve includes a tube; a valve configured to slide along an inner wall of the tube in an axial direction, and a spring that urges the valve, wherein the valve has a hydraulic pressure receiving surface on a first axial side that is one side in the axial direction, and a spring abutment against which the spring abuts, on a second axial side opposite to the first axial side, the tube has a discharge oil passage having an opening in the inner wall and extending through the inner wall in a radial direction, the opening of the discharge oil passage is formed so as to be closed in a state in which the valve is located at an initial position where the valve is located at an end of the first axial side and to be opened in a state in which the valve is located at an open position where the valve moves toward the second axial side relative to the initial position, and a first pressure receiving area in which the hydraulic pressure receiving surface receives a hydraulic pressure in the state in which the valve is located at the initial position is substantially equal to a second pressure receiving area in which the hydraulic pressure receiving surface receives a hydraulic pressure in the state in which the valve is located at the open position.

According to this structure, the first pressure receiving area when the valve t located at the initial position starts to move so as to open the opening is substantially equal to the second pressure receiving area when the valve located at the open position closes the opening. Therefore, it is possible to substantially eliminate the difference in the pressure to be received by the valve between the case where the valve is open and the case where the valve is closed. The open position where the opening is open is set at the position where the valve moves toward the second axial side relative to the initial position of the valve. Therefore, it is easy to reduce a movement amount for transition of the valve from the initial position to the open position. That is, the stroke amount of the valve can be reduced, thereby suppressing an increase in the axial length of the relief valve. According to this structure, it is possible to provide the relief valve in which the difference in the pressure to be received by the valve between the case where the valve is open and the case where the valve is closed is small.

Further features and advantages of the relief valve will become apparent from the following description of an embodiment with reference to the drawings.

BRIEF DESCRIPTION OF THE DRAWINGS

FIG. 6 is a schematic view illustrating an example in which an opening of a discharge oil passage is closed in a planar fashion by the distal end of a valve element.

DETAILED DESCRIPTION OF EMBODIMENTS

Figure 1:
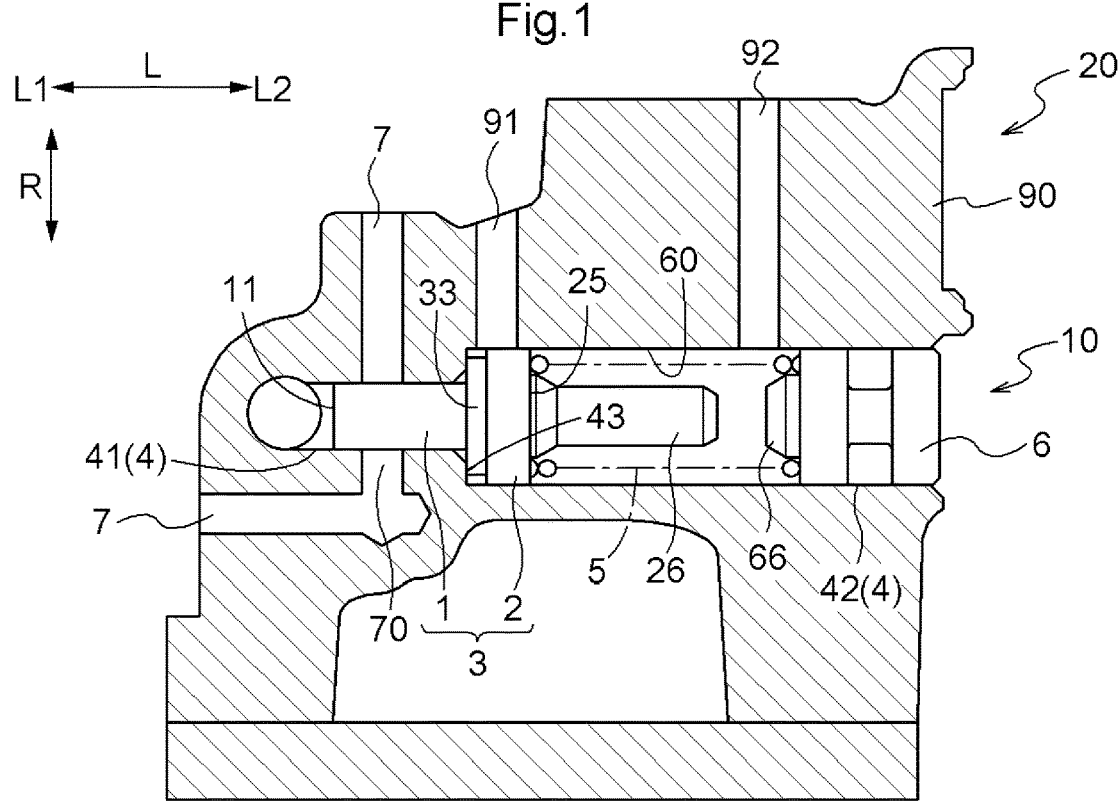
FIG. 1 is a partial sectional view of a hydraulic circuit including a relief valve located at an initial position.
Figure 2:
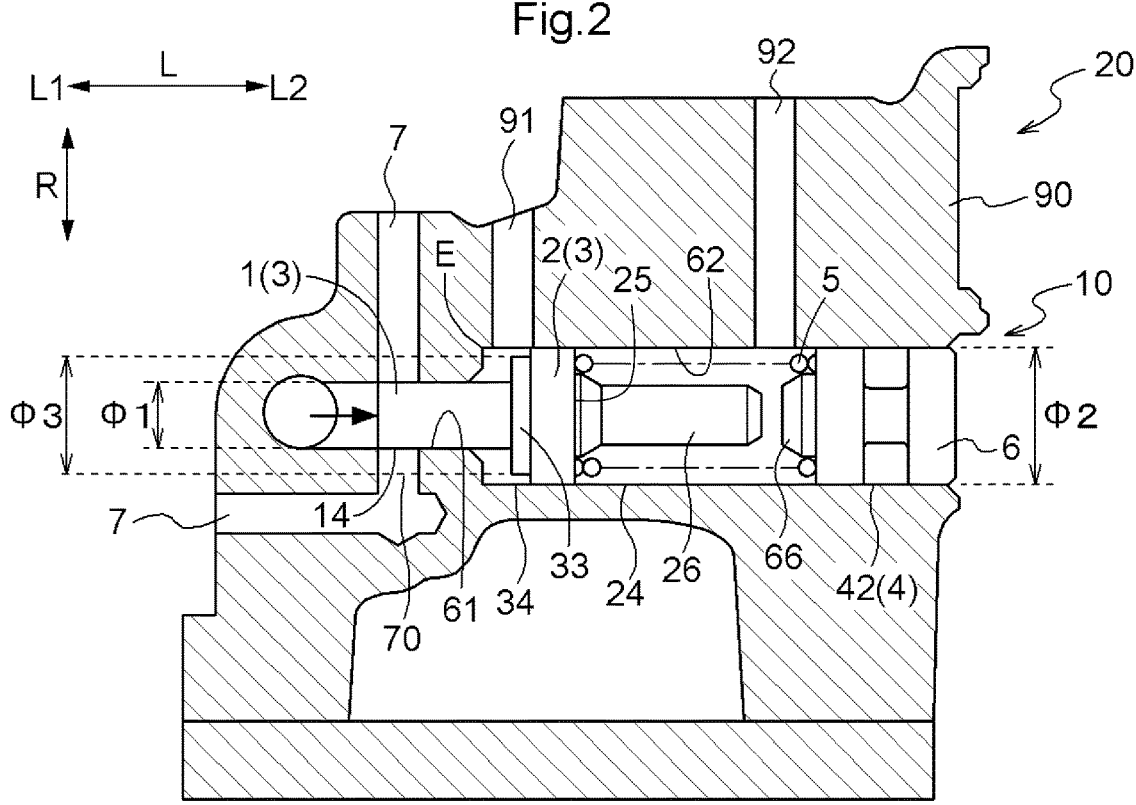
FIG. 2 is a partial sectional view of the hydraulic circuit including the relief valve located between the initial position and an open position.
Figure 3:
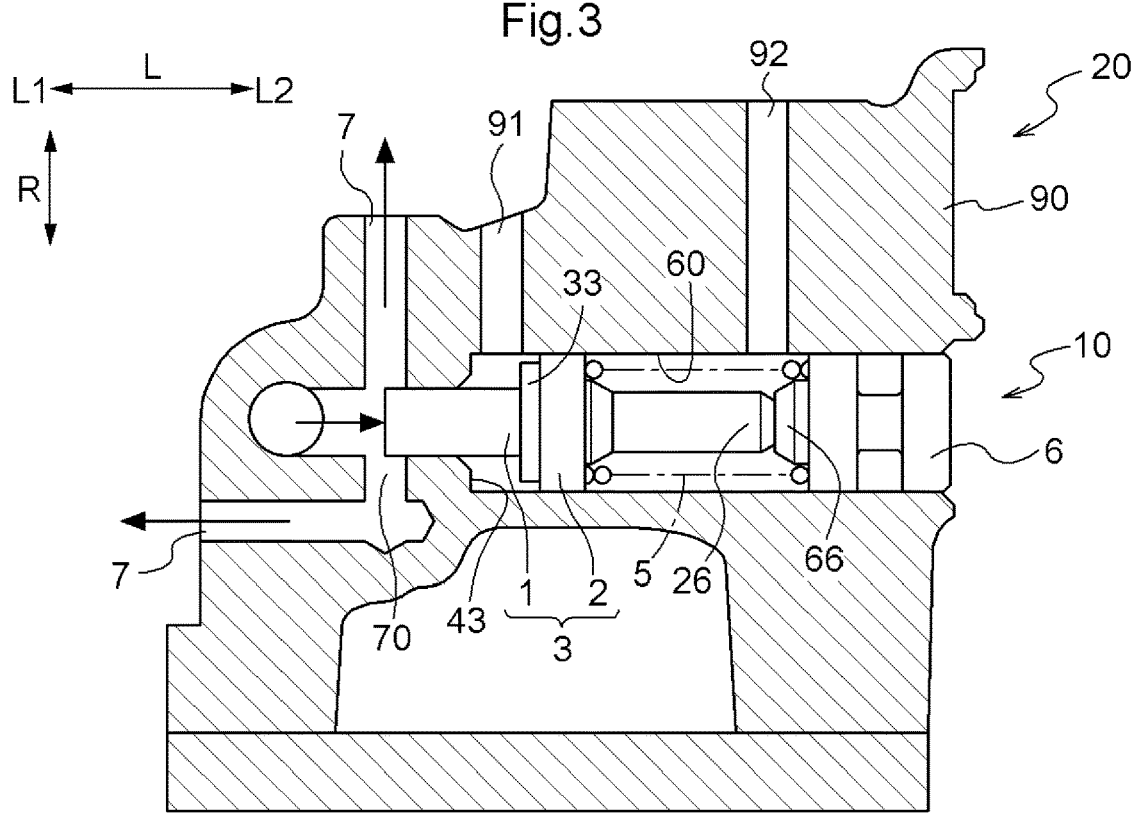
FIG. 3 is a partial sectional view of the hydraulic circuit including the relief valve located at the open position.

An embodiment of a relief valve is described below with reference to the drawings. FIG. 1 to FIG. 3 are sectional views of a part of a hydraulic circuit 20 including a relief valve 10. For example, the hydraulic circuit 20 is formed in a drive source for wheels of an automobile, such as an internal combustion engine or a rotating electrical machine, a power transfer path (such as a transmission) connecting the drive source to the wheels, and a pump body of an oil pump configured to discharge oil serving as hydraulic oil. The relief valve 10 is a hydraulic valve that is closed during a normal operation and is opened when a hydraulic pressure at a target part in the hydraulic circuit 20 exceeds a set value that is defined in advance to discharge a part of the hydraulic oil from the hydraulic circuit 20 to discharge oil passages 7.

As illustrated in FIG. 1 to FIG. 3, the relief valve 10 includes a tubular portion 4 (tube) formed in a block body 90 in which the hydraulic circuit 20 is formed, a valve element 3 (valve) configured to slide along an inner wall 60 of the tubular portion 4 in an axial direction L, and an urging member 5 (spring) that urges the valve element 3. The valve element 3 has a hydraulic pressure receiving surface 11 on a first axial side L1 that is one side in the axial direction L, and an urging member abutment portion 25 (urging member abutment) against which the urging member 5 abuts, on a second axial side L2 opposite to the first axial side L1. As described later, a first valve element portion 1 (first valve portion) located relatively on the first axial side L1 and a second valve element portion 2 (second valve portion) located relatively on the second axial side L2 are formed integrally in the valve element 3. The hydraulic pressure receiving surface 11 described above is provided at the first valve element portion 1, and the urging member abutment portion 25 described above is provided at the second valve element portion 2.

For example, the urging member 5 is a coil spring. In this embodiment, the urging member 5 is arranged between the urging member abutment portion 25 and a plug 6 fixed inside the tubular portion 4 at the end of the tubular portion 4 on the second axial side L2. The second valve element portion 2 has a restricting portion 26 extending toward the second axial side L2. The restricting portion 26 is formed so as to have a diameter smaller than the inner diameter of the urging member 5 (coil spring) and to extend toward the second axial side L2. A receiving portion 66 is formed on the first axial side L1 of the plug 6. Movement of the valve element 3 toward the second axial side L2 is restricted at a position where the restricting portion 26 abuts against the receiving portion 66 (see FIG. 3).

The tubular portion 4 has the discharge oil passages 7 having openings 70 in the inner wall 60 and extending through the inner wall 60 in a radial direction R. As illustrated in FIG. 1 to FIG. 3, the discharge oil passage 7 is formed in the block body 90 so that the opening 70 is open to the tubular portion 4. The opening 70 of the discharge oil passage 7 is formed so as to be closed in a state in which the valve element 3 is located at an initial position (position illustrated in FIG. 1) where the valve element 3 is located at the end of the first axial side L1 and to be opened in a state in which the valve element 3 is located at an open position (position illustrated in FIG. 3) where the valve element 3 moves toward the second axial side L2 relative to the initial position. In this embodiment, the opening 70 is closed when the valve element 3 is located on the first axial side L1 relative to the position of the valve element 3 illustrated in FIG. 2, and at least a part of the opening 70 is opened when the valve element 3 is located on the second axial side L2 relative to the position of the valve element 3 illustrated in FIG. 2.

Figure 4:
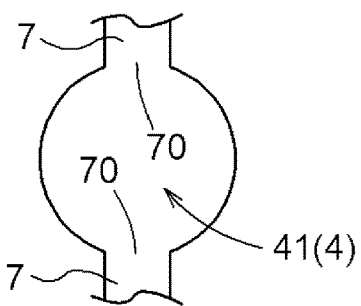
FIG. 4 is an axially orthogonal sectional view schematically illustrating an example of an arrangement of discharge oil passages.
Figure 5:
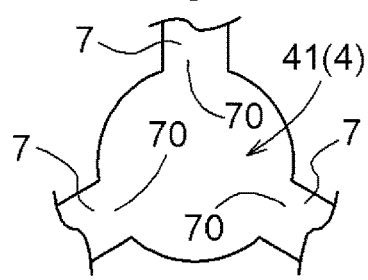
FIG. 5 is an axially orthogonal sectional view schematically illustrating an example of the arrangement of the discharge oil passages.

It is preferable that a plurality of openings 70 be formed in the inner wall 60 of the tubular portion 4 at equal intervals in a circumferential direction. That is, it is preferable that the discharge oil passages 7 communicating with the openings 70 be radially formed away from each other equidistantly (equiangularly) as exemplified in FIG. 4 and FIG. 5. If an even number (2n, provided that n is a natural number) of openings 70 and an even number of discharge oil passages 7 are provided, it is preferable that the openings 70 and the discharge oil passages 7 be formed at positions symmetrical about the center of the cylindrical tubular portion 4 as illustrated in FIG. 4. It is also preferable to employ a form in which three openings 70 and three discharge oil passages 7 be formed at intervals of 120°, for example, as illustrated in FIG. 5. Thus, an odd number ((2n−1), provided that n is a natural number) of openings 70 and an odd number of discharge oil passages 7 may be provided. By providing the openings 70 and the discharge oil passages 7 evenly along the circumferential direction of the tubular portion 4, the hydraulic oil is discharged evenly in the circumferential direction through the discharge oil passages 7, thereby reducing variation in the pressure in the circumferential direction on the hydraulic pressure receiving surface when the valve element 3 is located at the open position. That is, a stress acting on the valve element 3 along the radial direction R is suppressed.

The valve element 3 has a locked portion 33 (first lock) located on the second axial side L2 of the opening 70 at the initial position. The inner wall 60 of the tubular portion 4 has a locking portion 43 (second lock) configured to lock the locked portion 33 to restrict movement of the valve element 3 toward the first axial side L1. As described above, the valve element 3 has the first valve element portion 1 located relatively on the first axial side L1, and the second valve element portion 2 located relatively on the second axial side L2. Specifically, a portion located on the first axial side L1 of the locked portion 33 is referred to as the first valve element portion 1, and a portion located on the second axial side L2 of the locked portion 33 is referred to as the second valve element portion 2. At a boundary between the first valve element portion 1 and the second valve element portion 2, a second outside diameter $\varphi 2$ (and an undercut outside diameter $\varphi 3$) that is the outside diameter of the second valve element portion is larger than a first outside diameter $\varphi 1$ that is the outside diameter of the first valve element portion 1. The locked portion 33 is formed by a step at the boundary between the first valve element portion 1 and the second valve element portion 2 (see FIG. 2 for the outside diameters "$\varphi 1$ to $\varphi 2$").

The locked portion 33 has an undercut 34 formed so that the outside diameter on the first axial side (undercut outside diameter $\varphi 3$) is smaller than the outside diameter on the second axial side L2 (second outside diameter $\varphi 2$) (see FIG. 2). With the undercut 34, the locked portion 33 can be prevented from coming into contact with a corner E located at a boundary between a second inner wall portion 62 and a wall surface that defines the locking portion 43 even if the corner E is not processed so that the radius of the corner E decreases (the corner E is tapered). That is, a limitation on the shape of the locking portion 43 (and a limitation on its manufacture) can be relaxed by providing the undercut 34 on the locked portion 33.

FIG. 1 to FIG. 3 exemplify the form in which the undercut 34 is provided by forming the step so that the diameter on the first axial side L1 is smaller than that on the second axial side L2. The shape of the undercut 34 is not limited to that in this form. For example, the undercut 34 may be provided by forming an inclined surface that is inclined inward in the radial direction R with increasing proximity to the first axial side L1 from the second axial side L2.

The first valve element portion 1 is formed into a columnar shape with a constant outside diameter that is the first outside diameter $\varphi 1$, and a first outer peripheral portion 14 that is an outer peripheral portion of the first valve element portion 1 slides along the inner wall of the tubular portion 4. Similarly, the second valve element portion 2 is formed into a columnar shape with a constant outside diameter that is the second outside diameter $\varphi 2$, and a second outer peripheral portion 24 that is an outer peripheral portion of the second valve element portion 2 slides along the inner wall of the tubular portion 4. Similarly to the fact that the valve element 3 has the first valve element portion 1 and the second valve element portion 2, the tubular portion 4 has a first tubular portion 41 located on the first axial side L1 of the locking portion 43, the inner diameter of the first tubular portion 41 being a first inner diameter, and a second tubular portion 42 located on the second axial side L2 of the locking portion 43, the inner diameter of the second tubular portion 42 being a second inner diameter that is larger than the first inner diameter. The first outer peripheral portion 14 slides along a first inner wall portion 61 that is the inner wall 60 of the first tubular portion 41, and the second outer peripheral portion 24 slides along the second inner wall portion 62 that is the inner wall 60 of the second tubular portion. Although illustration is omitted for the first inner diameter and the second inner diameter because the drawings are complicated, the first inner diameter is substantially equal to the first outside diameter φ1 (slightly larger than the first outside diameter φ1 so that the valve element 3 is slidable), and the second inner diameter is substantially equal to the second outside diameter φ2 (slightly larger than the second outside diameter φ2 so that the valve element 3 is slidable).

Reference symbols 91 and 92 represent back pressure relief holes open to the tubular portion 4. The first back pressure relief hole 91 is provided in order to relieve a back pressure generated due to compression or expansion of air, hydraulic oil, or the like between the locked portion 33 formed on the second valve element portion 2 and the locking portion 43 of the tubular portion 4 when the valve element 3 moves along the axial direction L. The second back pressure relief hole 92 is provided in order to relieve a back pressure generated due to compression or expansion of air, hydraulic oil, or the like between the second valve element portion 2 and the plug 6 when the valve element 3 moves along the axial direction L.

As illustrated in FIG. 6, in a case of a structure in which an opening 70B is closed in a planar fashion by a distal end 30t of a valve element 30 that receives a hydraulic pressure, a part of the distal end 30t of the valve element 30 abuts against the periphery of the opening 70B to close the opening 70B. Therefore, the area in which the valve element 30 receives the pressure when the opening 70B is closed by the valve element 30 ($S_{CL}=\pi(A/2)^2$) differs from the area in which the valve element 30 receives the pressure when the opening 70B is open ($S_{OP}=\pi(B/2)^2$) (A<B, $S_{CL}<S_{OP}$). That is, a pressure in a case of transition of the relief valve from the closed state to the open state (opening pressure) differs from a pressure in a case of transition of the relief valve from the open state to the closed state (closing pressure). Thus, a so-called hysteresis occurs between the opening pressure and the closing pressure.

In the relief valve 10 of this embodiment, a first pressure receiving area in which the hydraulic pressure receiving surface 11 receives the hydraulic pressure in the state in which the valve element 3 is located at the initial position and a second pressure receiving area in which the hydraulic pressure receiving surface 11 receives the hydraulic pressure in the state in which the valve element 3 is located at the open position are substantially equal at "$\pi(\varphi1/2)^2$". Therefore, a pressure in a case of transition of the relief valve 10 from the closed state to the open state (opening pressure) is substantially equal to a pressure in a case of transition of the relief valve 10 from the open state to the closed state (closing pressure). Thus, the occurrence of the hysteresis between the opening pressure and the closing pressure is suppressed.

For example, in the relief valve of Japanese Patent Application Publication No. 2015-25551, a pressure receiving top portion (52) corresponding to the hydraulic pressure receiving surface 11 abuts against the valve element (5) at the initial position (reference symbols in parentheses represent components described in Japanese Patent Application Publication No. 2015-25551). Therefore, the hydraulic pressure to be received by the pressure receiving top portion (52) at the initial position and the hydraulic pressure to be received by the pressure receiving top portion (52) at a position where the valve element (5) moves in a direction in which the valve is opened from the initial state cannot be made as substantially equal as those in this embodiment. Thus, the hydraulic pressures differ from each other. Accordingly, the hysteresis is more likely to occur as compared to the relief valve of this embodiment. In Japanese Patent Application Publication No. 2015-25551, the hysteresis is reduced by increasing a distance from the initial position of the valve element (5) to an opening of a discharge oil passage (2) (to the open position). Thus, the occurrence of the hysteresis between the opening pressure and the closing pressure at the discharge oil passage (2) is suppressed. However, the axial length is therefore larger than that in this embodiment, thereby hindering downsizing of the relief valve.

The above description exemplifies the form in which the valve element 3 has the locked portion 33 located on the second axial side L2 of the opening 70 at the initial position and the inner wall 60 has the locking portion 43 configured to lock the locked portion 33 to restrict the movement of the valve element 3 toward the first axial side L1. However, a change in the pressure receiving area between the initial position and the open position can be suppressed as long as the hydraulic pressure receiving surface 11 does not abut against the locking portion 43 or the like at the initial position. Thus, the position of the locked portion 33 is not limited to the position on the second axial side L2 of the opening 70. The valve element 3 only needs to have the locked portion 33 different from the hydraulic pressure receiving surface 11. Such modifications are easy for persons having ordinary skill in the art, and therefore specific examples and detailed description are omitted.

Summary of Embodiment

A summary of the relief valve (10) described above is briefly described below.

As one aspect, the relief valve (10) includes the tubular portion (4), the valve element (3) configured to slide along the inner wall (60) of the tubular portion (4) in the axial direction (L), and the urging member (5) that urges the valve element (3).

The valve element (3) has the hydraulic pressure receiving surface (11) on the first axial side (L1) that is one side in the axial direction (L), and the urging member abutment portion (25) against which the urging member (5) abuts, on the second axial side (L2) opposite to the first axial side (L1).

The tubular portion (4) has the discharge oil passage (7) having the opening (70) in the inner wall (60) and extending through the inner wall (60) in the radial direction (R).

The opening (70) of the discharge oil passage (7) is formed so as to be closed in the state in which the valve element (3) is located at the initial position where the valve element (3) is located at the end of the first axial side (L1) and to be opened in the state in which the valve element (3) is located at the open position where the valve element (3) moves toward the second axial side (L2) relative to the initial position.

The first pressure receiving area in which the hydraulic pressure receiving surface (11) receives the hydraulic pressure in the state in which the valve element (3) is located at the initial position is substantially equal to the second pressure receiving area in which the hydraulic pressure receiving surface (11) receives the hydraulic pressure in the state in which the valve element (3) is located at the open position.

According to this structure, the first pressure receiving area when the valve element (3) located at the initial position starts to move so as to open the opening (70) is substantially equal to the second pressure receiving area when the valve element (3) located at the open position closes the opening (70). Therefore, it is possible to substantially eliminate the difference in the pressure to be received by the valve element (3) between the case where the valve is open and the case where the valve is closed. The open position where the opening (70) is open is set at the position where the valve element (3) moves toward the second axial side (L2) relative to the initial position of the valve element (3). Therefore, it is possible to reduce the movement amount for transition of the valve element (3) from the initial position to the open position. That is, the stroke amount of the valve element (3) can be reduced, thereby suppressing an increase in the axial length of the relief valve (10). According to this structure, it is possible to provide the relief valve (10) in which the difference in the pressure on the pressure receiving surface of the valve element (3) between the case where the valve is open and the case where the valve is closed is small.

It is preferable that the valve element (3) have the locked portion (33) different from the hydraulic pressure receiving surface (11), and the inner wall (60) have the locking portion (43) configured to lock the locked portion (33) to restrict the movement of the valve element (3) toward the first axial side (L1).

According to this structure, the initial position is set such that the locked portion (33) different from the hydraulic pressure receiving surface (11) restricts the movement of the valve element (3) toward the first axial side (L1). That is, the change in the pressure receiving area between the initial position and the open position can be suppressed because the hydraulic pressure receiving surface (11) does not abut against the locking portion (43) or the like at the initial position.

It is preferable that the locked portion (33) be located on the second axial side (L2) of the opening (70) at the initial position.

According to this structure, the initial position is set such that the movement of the valve element (3) toward the first axial side (L1) is restricted on the second axial side (L2) of the hydraulic pressure receiving surface (11) and the opening (70). That is, the change in the pressure receiving area between the initial position and the open position can be suppressed because the hydraulic pressure receiving surface (11) does not abut against the locking portion (43) or the like at the initial position.

It is preferable that the valve element (3) have the first valve element portion (1) located on the first axial side (L1) of the locked portion (33), and the second valve element portion (2) located on the second axial side (L2) of the locked portion (33), the second outside diameter ($\varphi 2$) that is the outside diameter of the second valve element portion (2) be larger than the first outside diameter ($\varphi 1$) that is the outside diameter of the first valve element portion (1) at the boundary between the first valve element portion (1) and the second valve element portion (2), and the locked portion (33) be formed by the step at the boundary between the first valve element portion (1) and the second valve element portion (2).

As described above, the valve element (3) has the hydraulic pressure receiving surface (11) on the first axial side (L1), and the urging member abutment portion (25) against which the urging member (5) abuts, on the second axial side (L2). The second outside diameter ($\varphi 2$) of the second valve element portion (2) located on the second axial side (L2) is larger than the first outside diameter ($\varphi 1$) of the first valve element portion (1) located on the first axial side (L1). That is, the urging member (5) is arranged on the side of the second valve element portion (2) having the larger diameter. Therefore, when the urging member (5) is structured by, for example, a coil spring, the diameter of the coil spring can be increased. By increasing the diameter of the coil spring, a necessary urging force is easily obtained without increasing the length in the axial direction (L). Thus, the axial length of the relief valve (10) is reduced easily.

It is preferable that the locked portion (33) have the undercut (34) where the outside diameter ($\varphi 3$) on the first axial side (L1) is smaller than the outside diameter ($\varphi 2$) on the second axial side (L2).

With the undercut (34), the limitation on the shape of the locking portion (43) can be relaxed. With the structure in which the undercut (34) communicates with the back pressure relief hole (91) or the like, a resistance to be generated when the valve element (3) moves can be reduced.

It is preferable that the first valve element portion (1) be formed into the columnar shape with the constant diameter, and the outer peripheral portion (14) of the first valve element portion (1) slide along the inner wall (60) of the tubular portion (4).

Since the columnar first valve element portion (1) slides along the inner wall (60) of the tubular portion (4), the valve element (3) can smoothly move along the axial direction (L). Further, the opening (70) of the discharge oil passage (7) having the opening (70) in the inner wall (60) of the tubular portion (4) and extending through the inner wall (60) in the radial direction (R) can appropriately be opened or closed through the slide.

As one aspect, it is preferable that the first valve element portion (1) have the columnar shape with the constant outside diameter that is the first outside diameter ($\varphi 1$), the second valve element portion (2) have the columnar shape with the constant outside diameter that is the second outside diameter ($\varphi 2$), and both the first outer peripheral portion (14) that is the outer peripheral portion of the first valve element portion (1) and the second outer peripheral portion (24) that is the outer peripheral portion of the second valve element portion (2) slide along the inner wall (60) of the tubular portion (4).

Since the columnar first valve element portion (1) slides along the inner wall (60) of the tubular portion (4), the valve element (3) can smoothly move along the axial direction (L). Further, the opening (70) of the discharge oil passage (7) having the opening (70) in the inner wall (60) of the tubular portion (4) and extending through the inner wall (60) in the radial direction (R) can appropriately be opened or closed through the slide. Since the columnar second valve element portion (2) also slides along the inner wall (60) of the tubular portion (4), the posture of the valve element (3) along the axial direction (L) is more stable. Thus, inclination of the valve element (3) is suppressed.

It is preferable that a plurality of the openings (70) be formed in the inner wall (60) of the tubular portion (4) at equal intervals in the circumferential direction.

According to this structure, the hydraulic oil is discharged evenly in the circumferential direction through the discharge oil passages (7), thereby reducing the variation in the pressure in the circumferential direction on the hydraulic pressure receiving surface (11) when the valve element (3) is located at the open position. Further, the stress acting on the valve element (3) along the radial direction (R) is suppressed.

The invention claimed is:

1. A relief valve, comprising
a tube;
a valve configured to slide along an inner wall of the tube in an axial direction, and
a spring that urges the valve, wherein
the valve has a hydraulic pressure receiving surface on a first axial side that is one side in the axial direction, and a spring abutment against which the spring abuts, on a second axial side opposite to the first axial side,
the tube has a discharge oil passage having an opening in the inner wall and extending through the inner wall in a radial direction,
the opening of the discharge oil passage is formed so as to be closed in a state in which the valve is located at an initial position where the valve is located at an end of the first axial side and to be opened in a state in which the valve is located at an open position where the valve moves toward the second axial side relative to the initial position,
a first pressure receiving area in which the hydraulic pressure receiving surface receives a hydraulic pressure in the state in which the valve is located at the initial position is substantially equal to a second pressure receiving area in which the hydraulic pressure receiving surface receives a hydraulic pressure in the state in which the valve is located at the open position,
the valve has a first lock different from the hydraulic pressure receiving surface, and the inner wall has a second lock configured to lock the first lock to restrict movement of the valve toward the first axial side,
the first lock is located on the second axial side of the opening at the initial position,
the valve has a first valve portion located on the first axial side of the first lock, and a second valve portion located on the second axial side of the first lock, and the first lock is formed by a step at the boundary between the first valve portion and the second valve portion,
the first lock has an undercut where the outside diameter on the first axial side is smaller than the outside diameter on the second axial side, and
the first lock has a first outside diameter larger than a second outside diameter of the hydraulic pressure receiving surface and smaller than a third outside diameter of the second valve portion.

2. The relief valve according to claim 1, wherein the first valve portion is formed into a columnar shape with a constant diameter, and an outer peripheral portion of the first valve portion is configured to slide along the inner wall of the tube.

3. The relief valve according to claim 1, wherein the first valve portion has a columnar shape with a constant outside diameter, the second valve portion has a columnar shape with a constant outside diameter, and both a first outer peripheral portion that is an outer peripheral portion of the first valve portion and a second outer peripheral portion that is an outer peripheral portion of the second valve portion are configured to slide along the inner wall of the tube.

4. The relief valve according to claim 1, wherein a plurality of the openings are formed in the inner wall of the tube at equal intervals in a circumferential direction.

* * * * *